United States Patent
Iovanni et al.

(10) Patent No.: US 7,669,426 B2
(45) Date of Patent: Mar. 2, 2010

(54) SHARED SWITCHING FOR MULTIPLE LOADS

(75) Inventors: Robert Alan Iovanni, Raymond, NH (US); Peter Edward Cann, Cambridge, MA (US); David J. Kelley, Natick, MA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 965 days.

(21) Appl. No.: 11/432,835

(22) Filed: May 11, 2006

(65) Prior Publication Data

US 2007/0262811 A1    Nov. 15, 2007

(51) Int. Cl.
*F25B 21/02* (2006.01)

(52) U.S. Cl. .............................. 62/3.2; 62/3.7; 330/77; 330/84; 330/89; 165/64; 165/267; 165/269

(58) Field of Classification Search ............ 62/3.2, 62/3.7, 159, 214; 165/64, 253, 259, 267, 165/269; 330/77, 79, 81, 84, 89, 98, 253, 330/264

See application file for complete search history.

(56) References Cited

U.S. PATENT DOCUMENTS

| | | | |
|---|---|---|---|
| 3,737,689 A | 6/1973 | Schuerholz | |
| 4,910,635 A | 3/1990 | Gilliland | |
| 5,450,727 A * | 9/1995 | Ramirez et al. | 62/3.7 |
| 5,601,141 A * | 2/1997 | Gordon et al. | 165/263 |
| 6,727,752 B2 * | 4/2004 | Skinner et al. | 330/251 |
| 6,981,381 B1 * | 1/2006 | Wang et al. | 62/3.2 |
| 7,290,395 B2 * | 11/2007 | Deal | 62/3.7 |
| 7,307,474 B2 * | 12/2007 | Nguyen | 330/207 A |
| 2002/0121094 A1 | 9/2002 | VanHoudt | |
| 2004/0134200 A1 | 7/2004 | Schroeder et al. | |

* cited by examiner

*Primary Examiner*—Haissa Philogene
(74) *Attorney, Agent, or Firm*—Townsend and Townsend and Crew LLP; David B. Raczkowski

(57) ABSTRACT

Circuits, methods, and systems are directed to controlling the amount and polarity of current to multiple loads with switches, where the loads share switching components. The loads may be thermoelectric elements, which heat or cool based on the state of the switches. The switches may be run in a single mode during a duty cycle, or multiple successive modes during the duty cycle to achieve full control of the loads.

35 Claims, 12 Drawing Sheets

Charging the Inductor
Positive Polarity

Charging the Inductor
Negative Polarity

Freewheel at +V

Freewheel at Ground

SHARED SWITCHING FOR MULTIPLE LOADS

BACKGROUND

The present invention relates generally to thermal devices and more particularly to thermal devices with multiple thermoelectric loads.

Thermal devices are used to control the temperature of an environment, within which a sample may reside. For example, one type of thermal device is a thermal cycler that can regulate the temperature of a biological or chemical reaction, such as a Polymerase chain reaction (PCR). In some reactions, the temperature must be raised or lowered in discrete, pre-programmed steps. Thus, the devices must be able to cool and heat a sample.

To provide heating and cooling, some thermal devices use thermoelectric cooling. Thermoelectric coolers or heat pumps use the Peltier effect to create a heat flux between the junctions of two different types of materials. The Peltier effect occurs when a current is passed through two dissimilar metals or semiconductors (n-type and p-type) that are connected to each other at two junctions (Peltier junctions). The applied current drives a transfer of heat from one junction to the other, cooling one junction while the other heats up. The direction of heat transfer is controlled by the polarity or direction of the applied current; reversing the polarity changes the sign of the heat absorbed/evolved. The heat gradient is proportional to the amount of current though the device.

Some thermal cyclers are equipped with multiple blocks and/or wells to allow several different reactions to be carried out simultaneously. Also, some apparatuses have a gradient function, which allows different temperatures indifferent parts of a block. Both configurations can utilize multiple Peltier junctions or loads, which may also be used to help achieve uniformity in temperature.

To provide both polarities of current, thermoelectric devices employ numerous power components to control the flow of current. Power components are typically the most expensive components in any type of amplifier design. Additionally, the number of power components is increased by having multiple thermoelectric (Peltier) loads.

Accordingly, it is desirable to provide circuits, methods, and systems for controlling the current to multiple loads while minimizing the number of power components.

SUMMARY

Accordingly, embodiments of the present invention provide circuits, methods, and systems directed to providing full current control to a device with multiple loads that share switching components.

In one exemplary embodiment of the present invention, a circuit has N+1 half-bridges, each having a first and second switch and a center tap. The circuit also has N channels, where N is an integer greater than two. Each channel is such that the Kth channel includes a load, a first terminal coupled with the center tap of the Kth half-bridge, and a second terminal coupled with the center tap of the (K+1)th half-bridge. The loads of each channel may include a thermoelectric element. The switches of the half-bridges may be opened or closed at any time to form a switch state. The state of the switches of the half-bridges determines if a current flows through each channel and the polarity of the current. Here, K is an integer that runs from one to N.

In one embodiment, the first switch of each half-bridge is coupled with a first potential, and the second switch of each half-bridge is coupled with a second potential. Each switch of the half-bridges may include a transistor. The transistor may be protected in the reverse-current direction by a diode action. The transistors may be of many types, including a metal-oxide semiconductor field effect transistor. In another embodiment, each channel includes a chargeable circuit. The chargeable circuit may include an inductor. In yet another embodiment, the circuit includes a control circuit for controlling the switches of the half-bridges.

In another exemplary embodiment of the present invention, a method is provided for configuring the switches of the half-bridges to operate in a first mode during a first duty cycle. The method sends a first signal to the first switch of one of the half-bridges such that the first switch is in a closed state during at least part of the first mode. The method also sends a second signal to the second switch of a second of the half bridges such that the second switch is in a closed state during the at least part of the first mode. The switch configuration of the first mode determines if a current flows through each channel and determines the polarity of the current through an active channel. When each channel of the circuit includes a chargeable circuit, the first or second signal may be a pulse width modulated signal.

In one embodiment, the chargeable circuit of each active channel of the first mode is charged; and subsequent to configuring the switches in a first mode, the switches of the half-bridges are configured to operate in one or more additional modes during the first duty cycle. The configuring of the switches of the half-bridges to operate in the first and subsequent modes may be repeated during subsequent duty cycles.

In another embodiment, the first mode charges a first channel and the second mode charges a second channel while the first channel is in a freewheel state. The freewheel state may be at ground, a positive voltage, or a negative voltage. The same polarity of current in the first channel during the first mode may continue during the second mode when the first channel is in a freewheel state. The first mode may charge one channel in one polarity, and a second mode may charge the channel in an opposite polarity. The first mode may also charge two channels.

In yet another embodiment, only one channel is charged during a mode. The configuring the switches in the modes includes providing all of the second switches of the half-bridges in a closed state; opening the second switch and closing the first switch of the first half-bridge to operate in the first mode; opening the second switch and closing the first switch of the Kth half-bridge to operate in a Kth mode, wherein each mode may have a zero or finite duration; and closing each second switch and opening each first switch of the Kth half bridge to operate in a (N+K)th mode.

In another exemplary embodiment of the present invention, a system includes the circuit and logic to control the circuit. The system or the logic may include error circuits, A/D and D/A converters, storage for memory, an oscillator, and switch drivers.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

DETAILED DESCRIPTION OF THE INVENTION

Embodiments of the present invention provide circuits, methods, and systems for controlling the amount and polarity of current to multiple loads. Embodiments of the invention are useful in, for example, thermoelectric coolers/heat pumps, which require both polarities of current through the loads. One polarity causes a load to transfer heat in one direction, and another polarity causes the transfer of heat in the opposite direction. Embodiments of the present invention are particularly useful for PCR thermal cycler devices.

Figure 1:
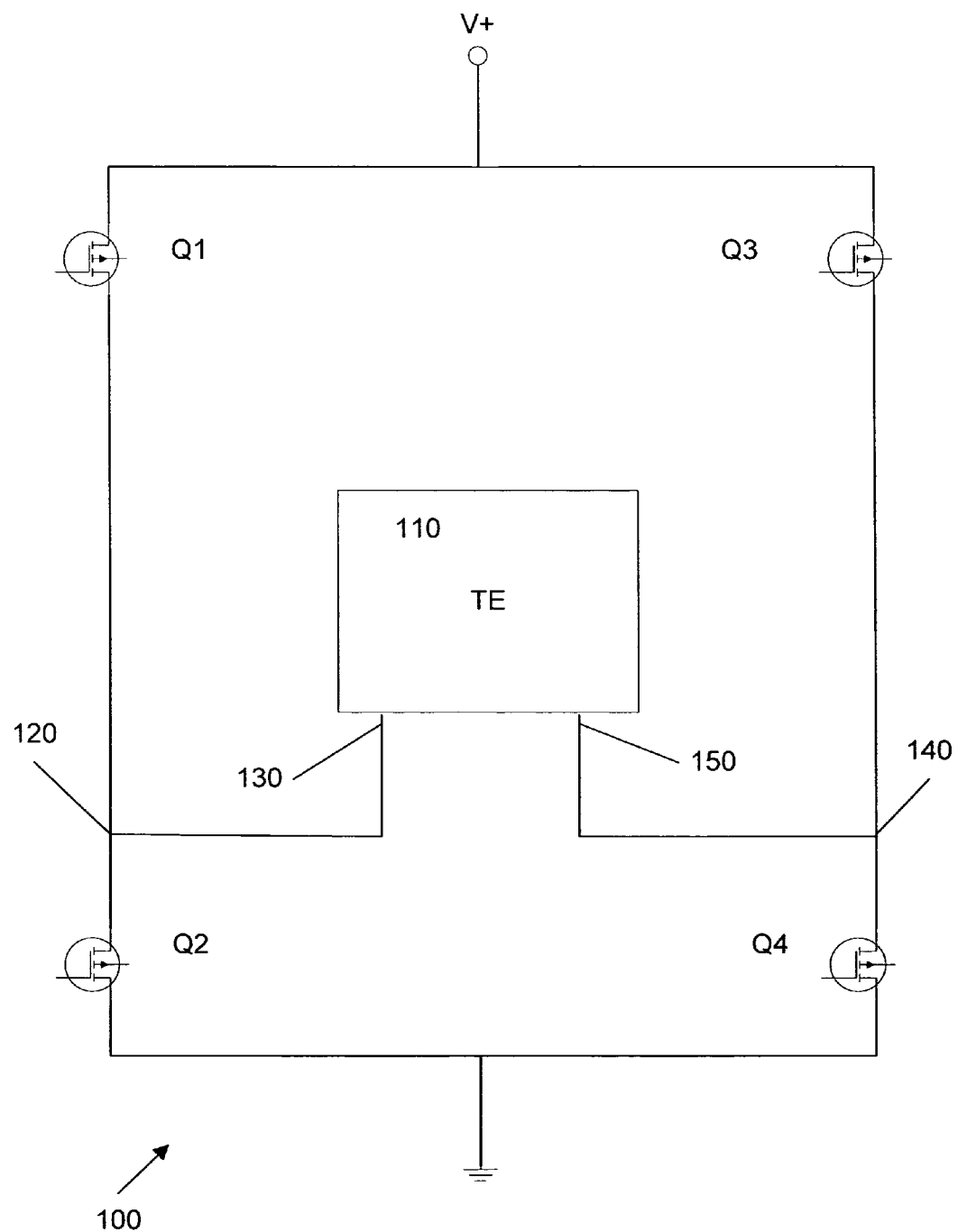
FIG. 1 illustrates a thermoelectric device capable of sending current in both polarities through a single load or channel.

FIG. 1 shows a thermoelectric device 100 having a single load or thermal element 110. The top terminal of the device 100 is connected to a positive voltage and the bottom terminal is connected to ground. The voltages may vary in amount and sign, and relative values compared to each other. The four switches Q1-Q4 control the polarity (direction) of current through the thermal element (TE) 110. When a switch is turned on or closed, current may travel though the switch. If a switch is turned off or is open, then current will not travel through the switch.

Q1 and Q2 form one half-bridge switching arrangement having a center tap 120. Terminal 130 of TE 110 is coupled with the center tap 120. Q3 and Q4 form another half-bridge switching arrangement having a center tap 140. Terminal 150 of TE 110 is coupled with the center tap 140. As used herein, the term "coupled with" allows intervening circuit elements between two elements that are coupled, as well as allowing a direct connection between two circuit elements.

Together, the two half-bridges form a full bridge that allows for current to flow in either direction through TE 110. If Q1 and Q4 are closed while Q2 and Q3 are open, the current runs from left to right and TE 110 is heated. To be precise, TE 110 transfers heat such that a sample or object proximal to TE 110 is heated. If Q2 and Q3 are closed while Q1 and Q4 are open, the current runs from right to left and TE 110 is cooled. The relation of the current to the heating/cooling effect may be reversed, e.g. current from right to left may heat TE 110. Also, the relation of the switches to heating/cooling may be reversed, e.g. by reversing the polarity of the voltages, or the voltage difference, applied to the voltage terminals.

Figure 2:
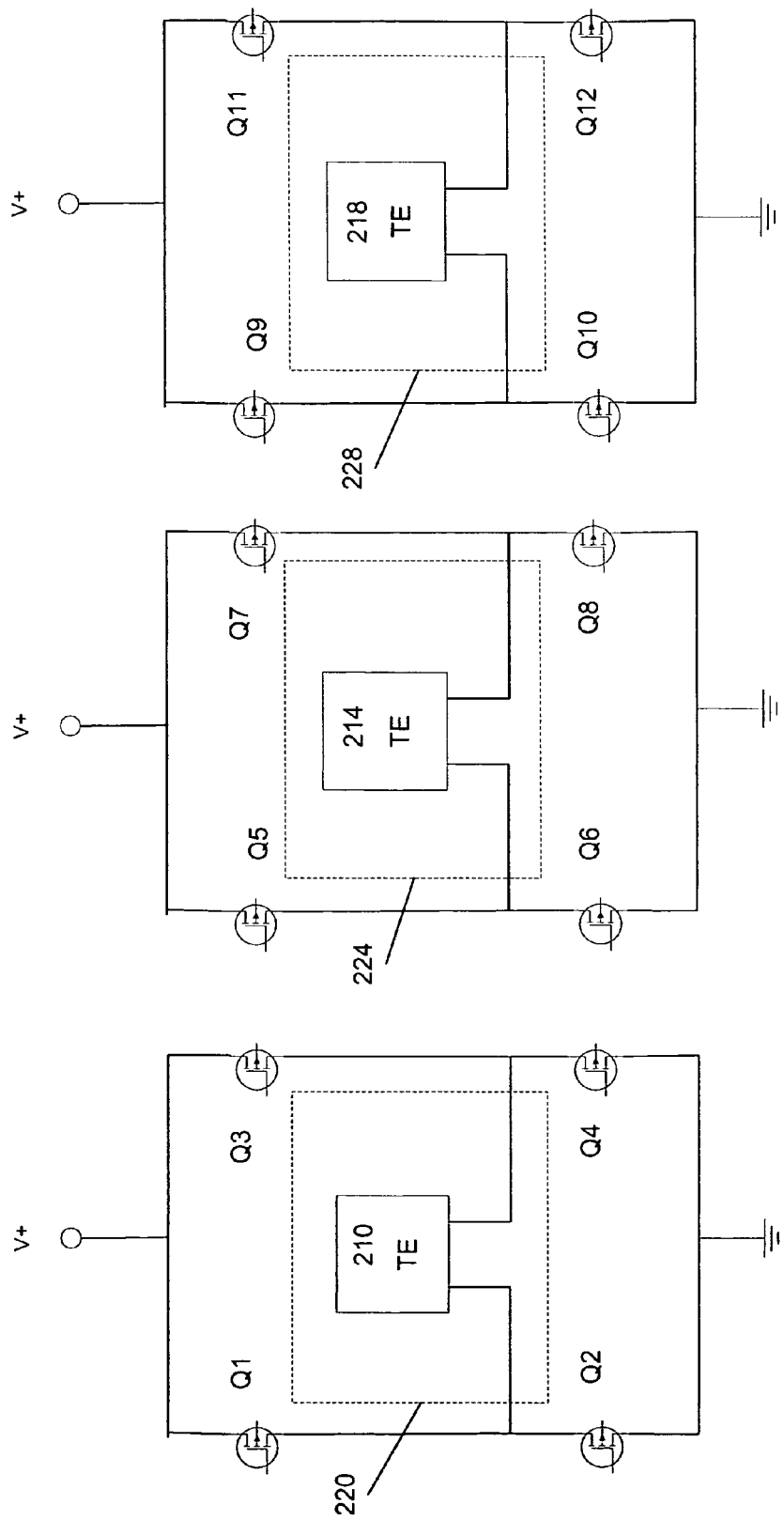
FIG. 2 illustrates a thermoelectric device having multiple channels.

In order to control the temperature of multiple samples or multiple parts of a single sample, additional thermal elements may be used. FIG. 2 shows a thermoelectric device 200 having three channels 220, 224, and 228 each with a respective TE 210, 214, and 218. The four switches Q1-Q4 control the direction of current through channel 220. Similarly, the four switches Q5-Q8 control the direction of current through channel 224, and the four switches Q9-Q12 control the direction of current through channel 228.

Each one of the thermal elements may be controlled independently of each other. Thus, each TE may be made to cool or heat an object based on the configuration of the switches. Also, each thermal element of device 200 is controlled in the same manner as described above with reference to thermoelectric device 100. A drawback of thermoelectric device 200 is the large number of switches, which are often the most expensive components in the design.

Figure 3:
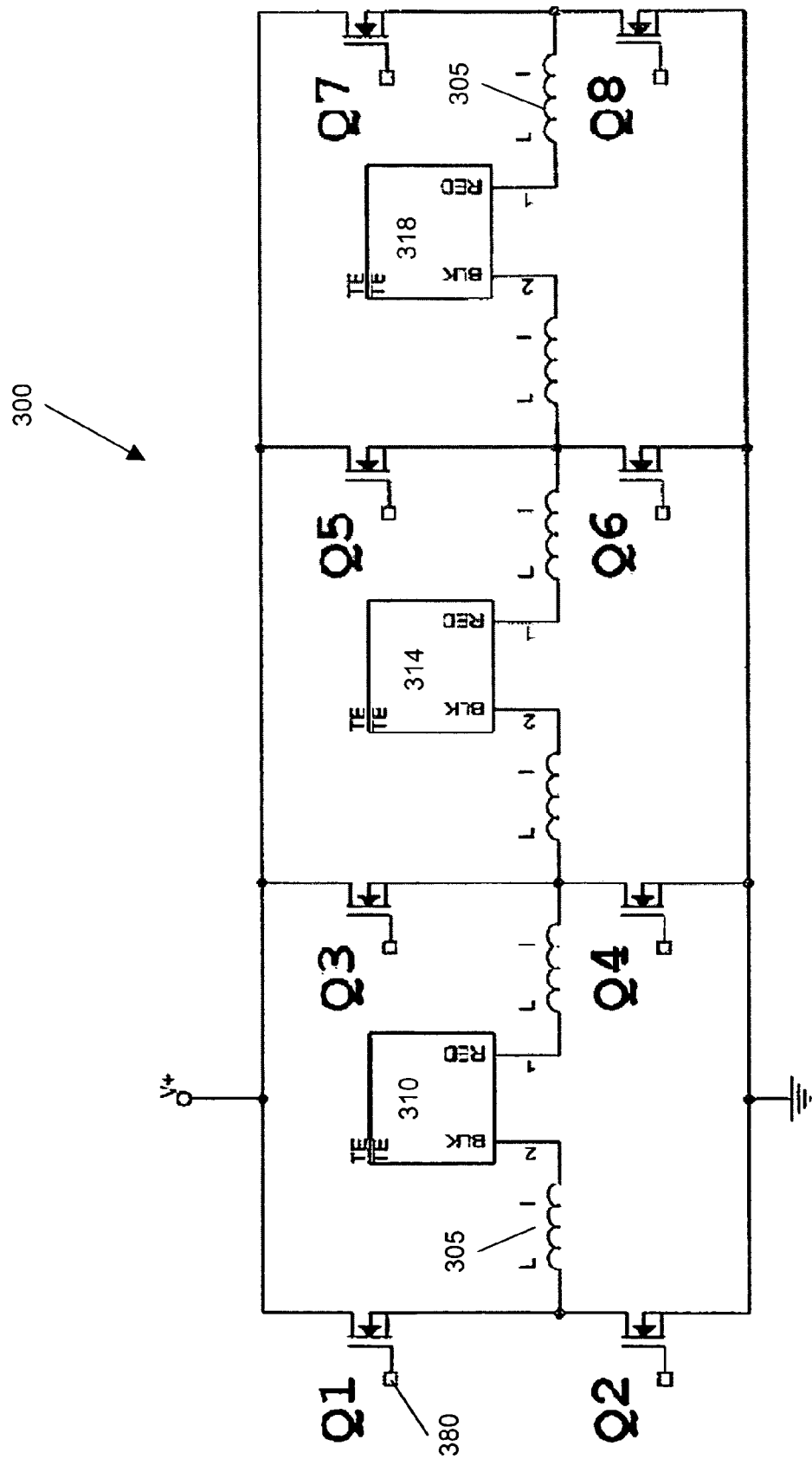
FIG. 3 illustrates a thermoelectric device having multiple channels according to an embodiment of the present invention.

FIG. 3 shows a thermoelectric device 300 having multiple channels according to an embodiment of the invention. The three thermal elements 310, 314, and 318, which are each within a different channel, now share some of the half-bridges. For example, TE 310 and TE 314 share a half-bridge containing Q3 and Q4, and TE 314 and TE 318 share a half-bridge containing Q5 and Q6. Thus, thermoelectric device 300 has only eight switches Q1-Q8, which is four less than thermoelectric device 200.

The operation of device 300 is however more complex than that of device 200 due to the operation of one channel possibly affecting the operation of another channel. The four switches Q1-Q4 directly control the polarity of current through the thermal element 310. However, switches Q3 and Q4 also directly control the polarity of current flowing through TE 314. Depending on the settings of all of the switches, Q1 and Q2 may also impact the polarity of current through TE 314 due to the configuration of the device 300. For example, if Q1 and Q6 are closed and Q2-Q5 are open, current will travel from left to right through TE 314. The other switches are similarly situated with respect to the other TEs.

It should be appreciated that device 300 is but one example of a thermal device, and that a thermal device according to the present invention can include only two TEs, or greater than three TEs. Additionally, the switches may be a MOSFET, IGBT, BPJT, other transistors, combinations of transistors, gate turn-off thyristor, or any other suitable switching device.

Also, each switch may be protected in the reverse-current direction, e.g. by a diode or other element that provides similar protection.

In the operation of device 300 in one mode, one or more of the switches coupled with the higher potential are turned on or closed during at least part of the mode, and one or more of the switches coupled with the lower potential are turned on or closed during this part of the mode. This configuring of the state of the switches controls whether a channel is active, i.e. has a current, or is non-active. The configuration also determines if a channel is heating or cooling based on the polarity of the current through the channel. During this duty cycle, control signals 380 sent to the switches control the configuration or state of the switches.

Besides controlling which channels are active with a specified polarity, the control signals also control the amount of cooling/heating. This is accomplished, in one aspect, with a pulse-width modulated (PWM) signal that turns on and off the active switches during a mode, thus controlling the current through the TEs. An active switch is one that is "on" or actively changing, e.g. via a PWM signal, during a mode. If there is only one mode during a duty cycle, this mode may be called a "steady-state" mode. In this manner, an active switch may only be open some of the time, or chopped, during a mode.

The width of the pulses in the PWM signal may be controlled by a control circuit in a feedback loop based on the temperature of the samples. The control circuit may use analog and/or digital computation and may use programmable or fixed logic. The control circuit and system is further discussed below in relation to FIG. 14.

To facilitate an even current through an active channel, a channel may include a storage circuit. The storage circuit may store some of the energy (charge) when a switch is "on", and release the energy when the switch is "off." For example, inductors 305 may be used to produce a more even current flow corresponding to the average voltage over time. There may be one or more inductors associated with each TE, or there may be zero. Other circuit elements, such as a capacitor in parallel with the load, may be used instead of or in addition to an inductor.

Figure 4:
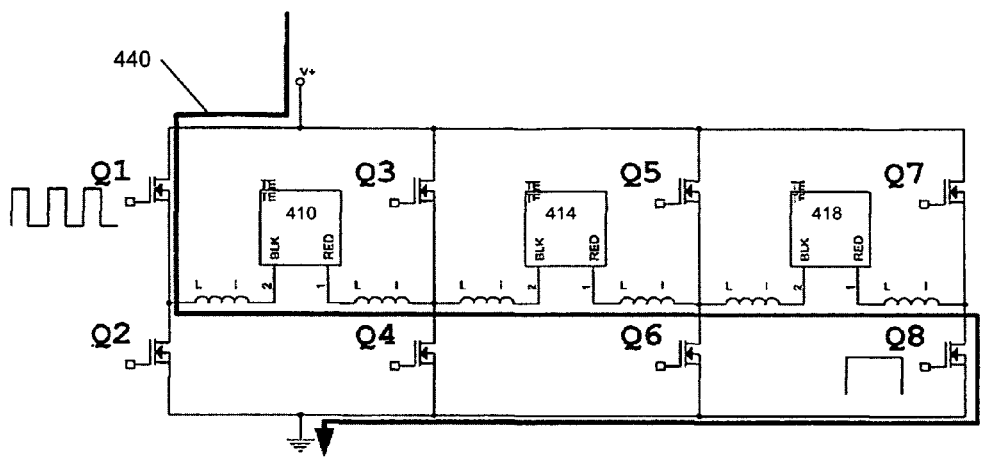
FIG. 4 illustrates heating all channels in a steady-state mode of operating a multi-channel thermoelectric device according to an embodiment of the present invention.

FIGS. 4-7 illustrate different examples of operating device 300 in a "steady-state" mode according to an embodiment of the invention. FIG. 4 shows a mode where all of the TEs 410-418 have a current from left to right such that the TEs are all heated. Switches Q1 and Q8 are closed. The other switches are in an open state and do not let current pass. Thus, current flows along path 440. The level of heating may be controlled by a PWM signal through either or both of switches Q1 or Q8. For example, if Q1 receives a PWM control signal, Q8 may continuously be closed during this mode. The voltage difference may also be altered to control the current through the TEs.

Figure 5:
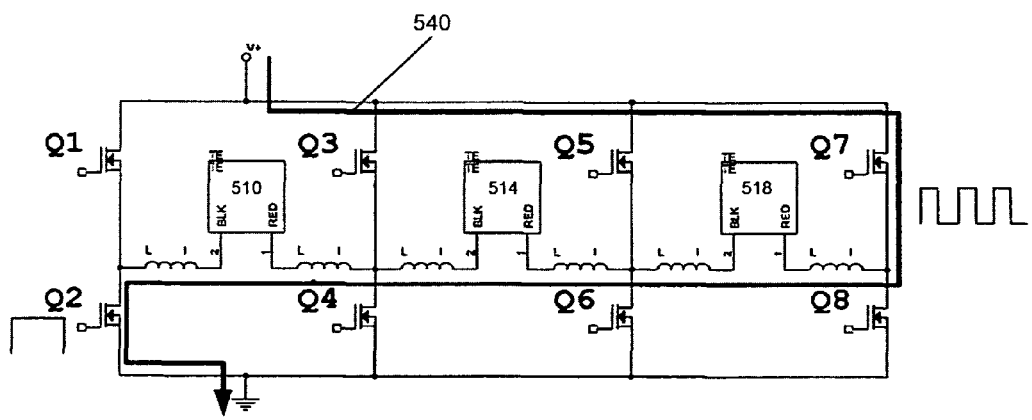
FIG. 5 illustrates cooling all channels in a steady-state mode of operating a multi-channel thermoelectric device according to an embodiment of the present invention.

FIG. 5 shows a mode where all of the TEs 410-418 have a current from right to left such that the TEs are all cooled. Switches Q7 and Q2 are turned on. The other switches are in an open state and do not let current pass. Thus, current flows along path 540. The level of cooling may be controlled by a PWM signal through switches Q2 and/or Q7.

Figure 6:
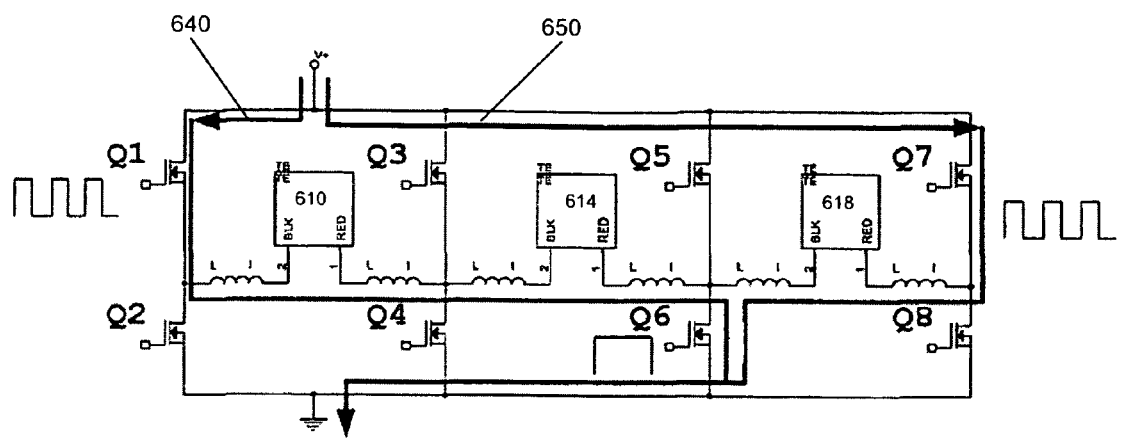
FIG. 6 illustrates heating two channels and cooling one channel in a steady-state mode of operating a multi-channel thermoelectric device according to an embodiment of the present invention.

Combinations of "heating" and "cooling" can also be realized. For example, FIG. 6 shows a mode where TEs 610 and 614 are heated, and TE 618 is cooled. Switches Q1, Q7, and Q6 are turned on, and the other switches are turned off. Current flows along path 640 through TEs 610 and 614 as Q1 and Q6 are active. Current also flows along path 650 through TE 618 as Q7 and Q6 are active. In one embodiment, switches Q1 and Q7 receive separate PWM signals to control the amount of current through the respective TEs, and Q6 is kept continuously in a closed state. Thus, switch Q6 steers the current from the PWM-controlled devices Q1 and Q7. The separate PWM signals may have pulses of the same or different widths.

Figure 7:
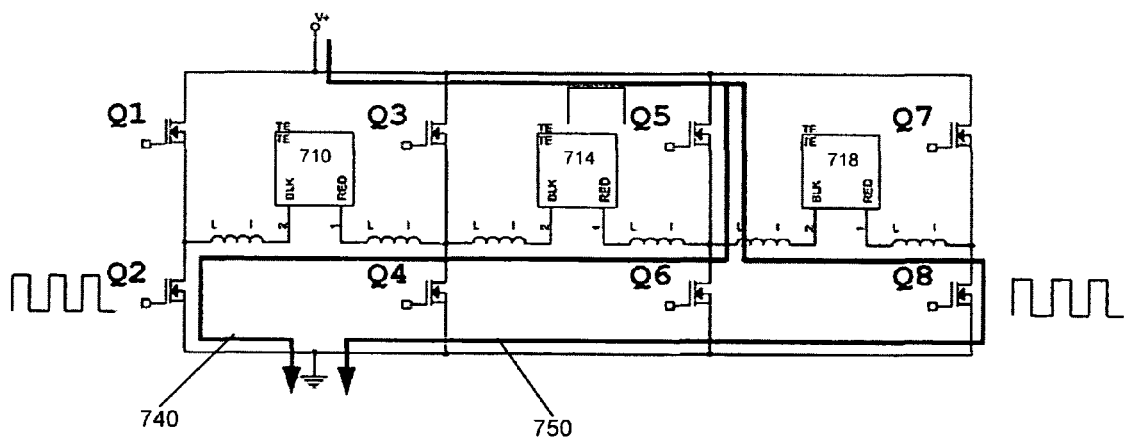
FIG. 7 illustrates cooling two channels and heating one channel in a steady-state mode of operating a multi-channel thermoelectric device according to an embodiment of the present invention.

FIG. 7 shows a state where TEs 710 and 714 are cooled, and TE 718 is heated. Switches Q5, Q2, and Q8 are turned on, and the other switches are turned off. Current flows along path 740 through TEs 710 and 714 as Q5 and Q2 are active. Current also flows along path 750 through TE 718 as Q5 and Q8 are active. In one embodiment, switches Q2 and Q8 have a PWM signal through them to control the amount of current through the respective TEs, and Q5 is kept continuously in a closed state. Thus, switch Q5 steers the current through the PWM-controlled devices Q2 and Q8.

Additional steady-state modes include modes having no current to a load of the channel, thus a non-active channel. In some embodiments, including a chargeable circuit, such as an inductor, certain modes will not charge a non-active channel. The non-charging of a non-active channel may be due to all of the switches around a TE being off, or both ends of a TE being coupled to the same voltage. In the latter case, the thermal element (load) would be in a freewheel state.

In steady-state operation, there are a few modes of heating and cooling that are not available, such as having TE 710 being cooled, TE 714 being off, and TE 718 being cooled. Also, in steady-state operation adjoining channels may be tied to the same driving signal and thus heat or cool at the same rate. Accordingly, a maximum level of control may not be achieved. However, a "time-slice" method according to one embodiment overcomes these limitations.

The time-slice method moves between multiple steady-state modes during a single duty cycle. Storage circuits, such as inductors 305, are utilized to ensure a proper current or voltage at the TEs. Each inductor 305 associated with a TE is charged for a certain period of time during a mode. A channel having inductor 305 may then be set to freewheel (e.g., both terminals being coupled to the same voltage) during another mode when another channel might be charging. While in a freewheel state, the channel may continue to have the same current due to the energy stored in the inductor.

Figure 8A:
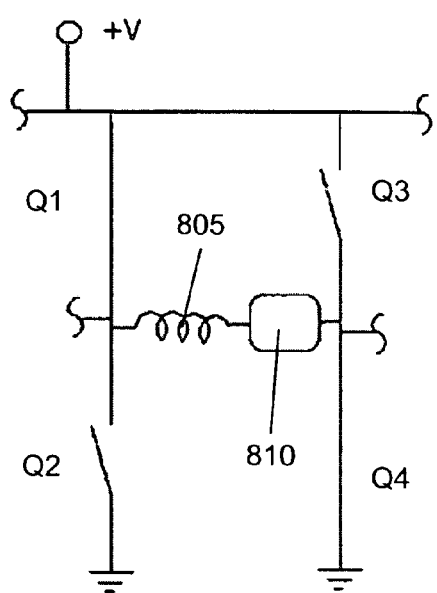
FIGS. 8A-8D illustrate different switch states for charging and freewheeling a channel according to an embodiment of the present invention.

FIG. 8A shows four switches Q1-Q4 coupled with a single channel of an inductor 805 and a load 810. The channel could be any channel of a device according to an embodiment of this invention, such as device 300. FIG. 8A shows a switch state where current flows in the positive polarity and where inductor 805 is charging in the positive polarity.

Figure 8B:
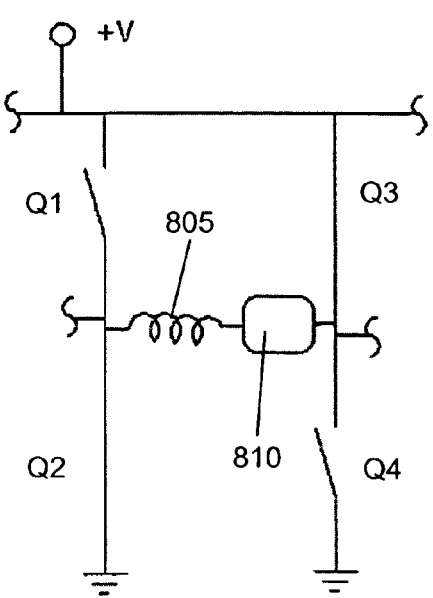
Figure 8C:
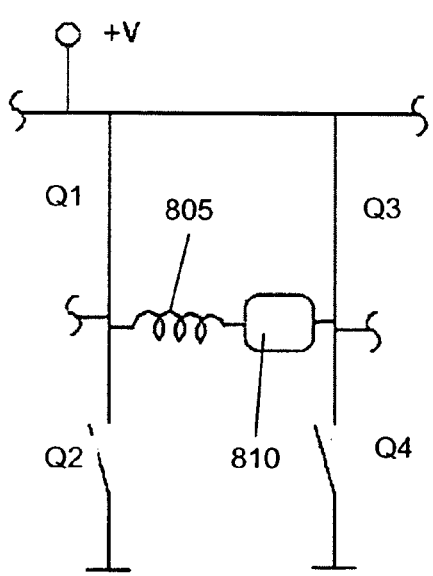
Figure 8D:
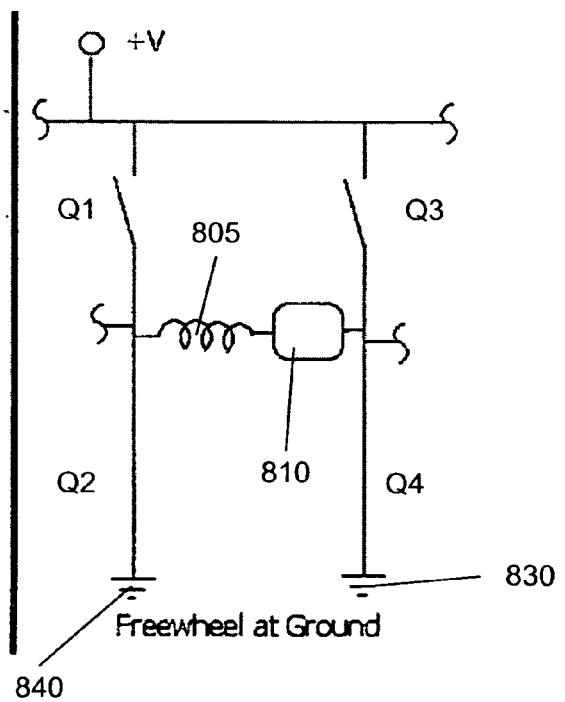

If Q1 opens and Q2 closes, the resulting freewheel state is shown in FIG. 8D. In this state, the charge (energy) stored in inductor 805 will dissipate through load 810 to ground 830, thus keeping current flowing in the positive polarity. If Q4 opens and Q3 closes, the resulting freewheel state is shown in FIG. 8C. In this state, the charge stored in inductor 805 will again dissipate through load 810 in the loop formed by the closed switches Q1 and Q3, thus keeping current flowing in the positive polarity. In this current loop, the switch may conduct in either direction or current may pass in the reverse direction through a bypass, such as a diode in parallel with the switch. During the switching time (perhaps a few hundred nanoseconds), the protective diodes of the switching devices may also carry the current if necessary.

FIG. 8B shows a switch state where current flows in the negative polarity and where inductor 805 is charged in the negative polarity. If Q3 opens and Q4 closes, the resulting freewheel state is shown in FIG. 8D. In this state, the charge (energy) stored in the inductor 805 will dissipate through load 810 to ground 840, thus keeping current flowing in the negative polarity. If Q2 opens and Q1 closes, the resulting freewheel state is shown in FIG. 8C. In this state, the charge stored in inductor 805 will again dissipate through load 810 in the loop formed by the closed switches Q1 and Q3, thus keeping current flowing in the negative polarity. Additional inductors, e.g. on the right side of load 810, may also be used.

Figure 9:
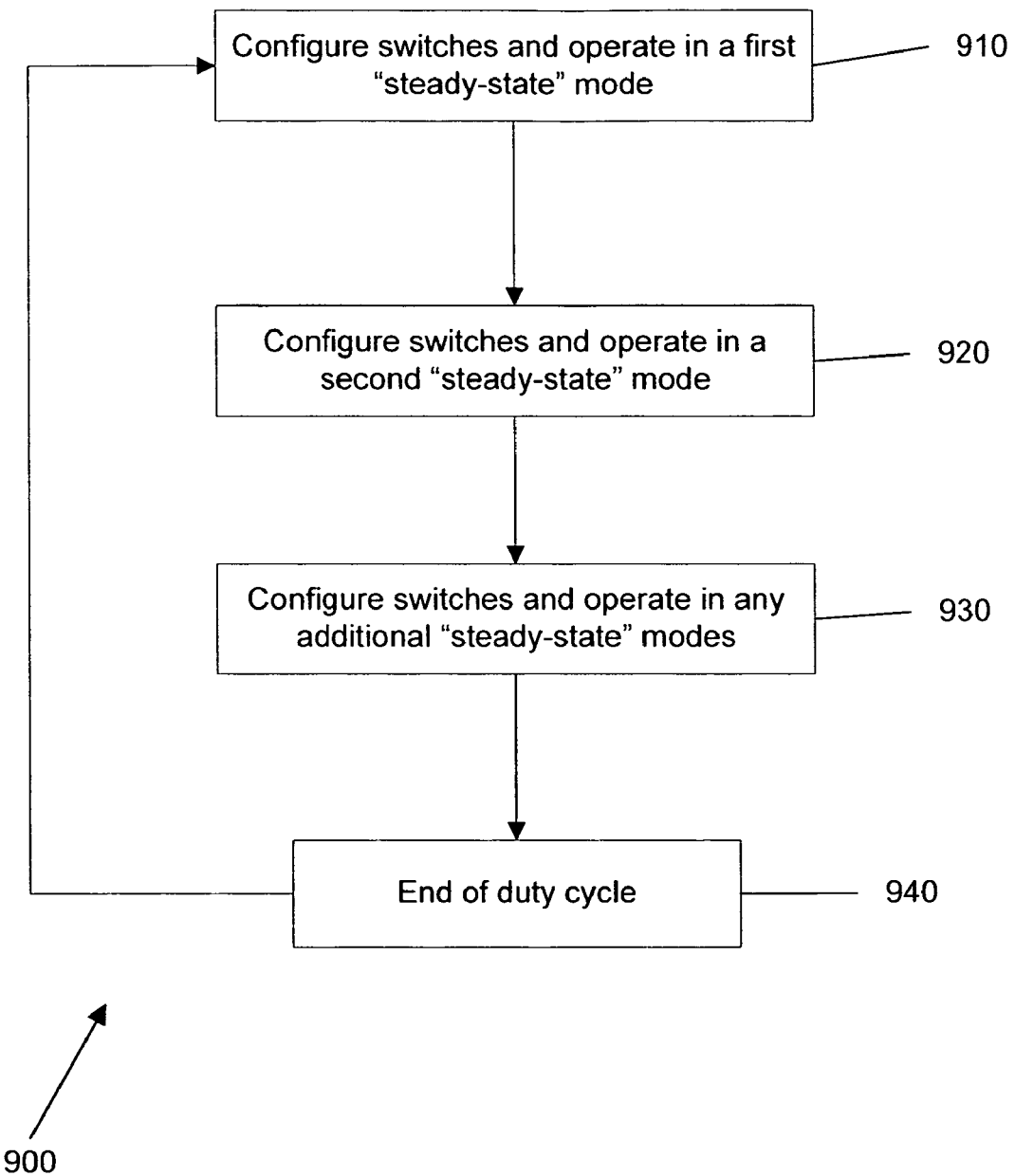
FIG. 9 illustrates a time-slice method of operating a multi-channel thermoelectric device according to an embodiment of the present invention.

FIG. 9 shows a time-slice method 900 for operating a multi-channel device, such as 300, according to an embodiment of the present invention. Method 900 operates the multi-channel device in successive modes during a duty cycle. In step 910, the switches of the multi-channel device are configured to operate in a first steady-state mode. In this first mode, one or more of the switches may be driven by a PWM signal. After operating the multi-channel device in the first mode, the switches of the multi-channel device are configured to operate in a second steady-state mode in step 920. After operating in the second mode, in step 930, the switches of the multi-channel device are optionally configured to operate in additional and successive steady-state modes until the end of the duty cycle. Once the end of the duty cycle is reached at step 940, method 900 repeats. In this manner, full control of any heating/cooling configuration may be achieved. The time of a single duty cycle may be constant or may vary from duty cycle to another.

If a channel is active during a mode, it is charged for at least part of the duty cycle dedicated to that mode. A mode may charge a set of channels. The set of channels may include all of the channels or one channel, or even no channels. However, at least one mode involves charging at least one channel. Non-active channels may freewheel while another set of channels are charging. Once a new heating/cooling distribution is desired, a different sequence of successive modes may be utilized.

Figure 10A:
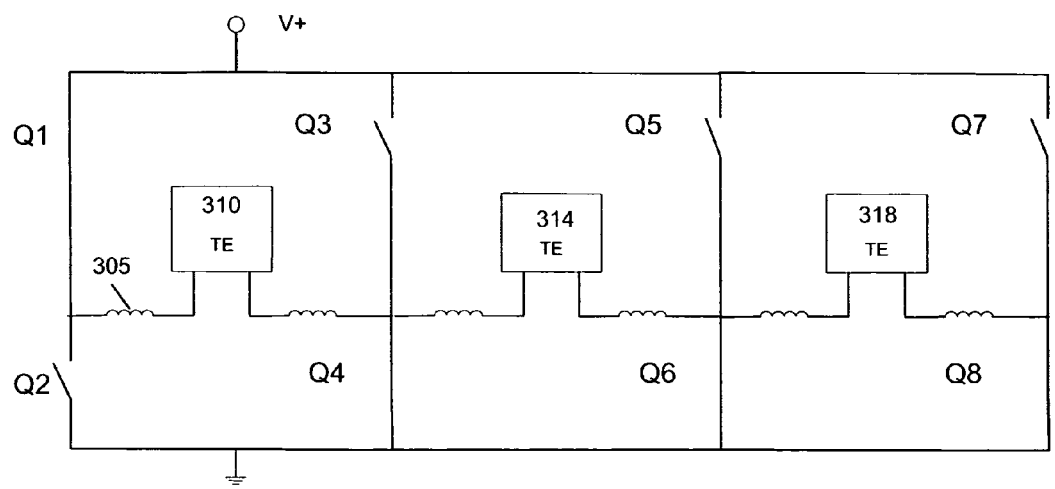
FIGS. 10A-10C illustrate three successive steady-state modes that may occur while operating a multi-channel thermoelectric device according to an embodiment of the present invention.
Figure 10B:
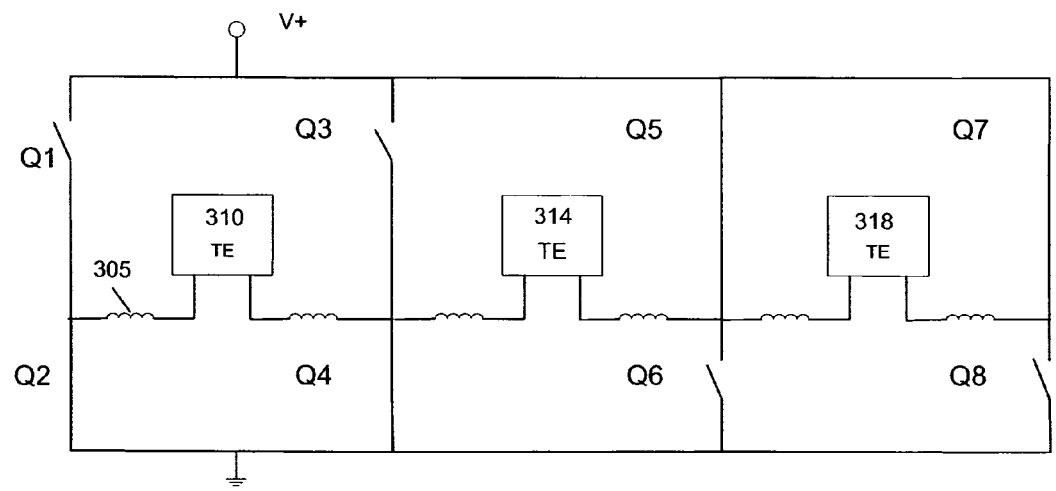
Figure 10C:
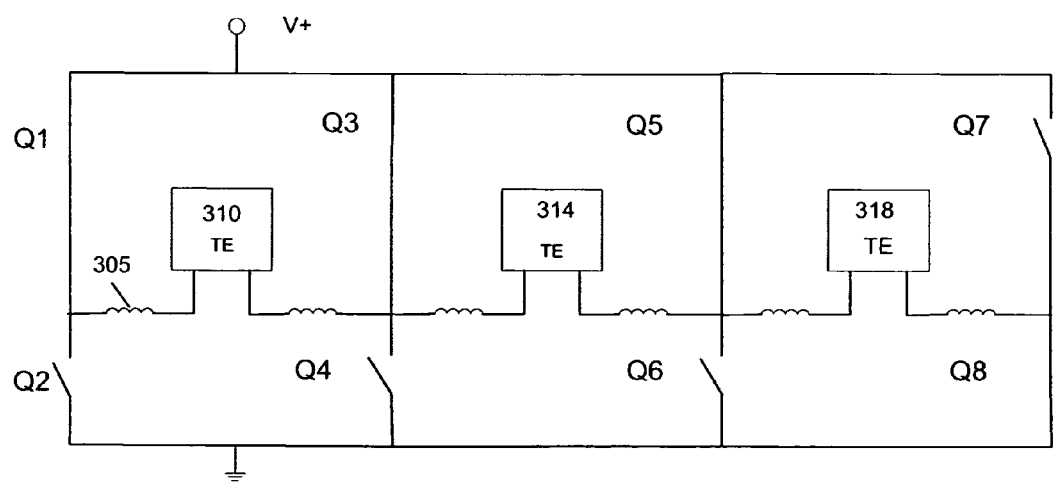

FIGS. 10A-10C illustrate three successive modes of operating device 300 according to an embodiment of method 900. FIG. 10A shows a first mode having a switch state such that the channel with TE 310 is being charged in the positive polarity. In one embodiment, step 910 corresponds to this switch state. The other TEs 314 and 318 are freewheeling at ground. The device 300 operates in this mode for a certain percentage of the duty cycle. In one embodiment, the time spent in this mode is about 33% of the duty cycle.

FIG. 10B shows a second mode such that the channel with TE 314 is being charged in the negative polarity. In one embodiment, step 920 corresponds to this mode. TE 310 is freewheeling at ground. TE 318 is freewheeling at V+. FIG. 10C shows a third mode such that the channel with TE 318 is being charged in the positive polarity. The other TEs 310 and 314 are freewheeling at V+.

In this manner, the device 300 is operated to heat the left channel, cool the middle channel, and heat the right channel at any desirable level. The current through each channel can be controlled independently of the current through the other channels based on the PWM signal applied to the active channel during each mode.

Figure 11A:
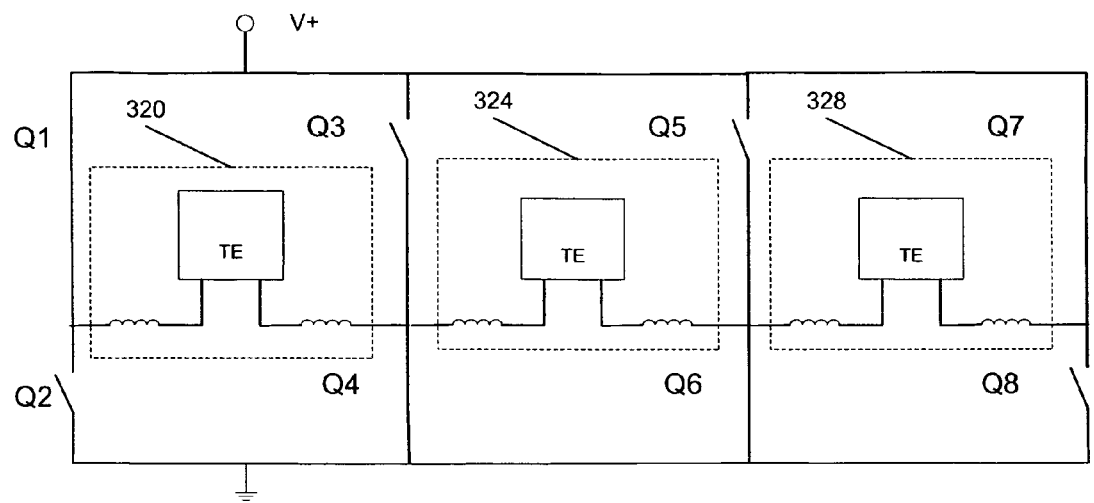
FIGS. 11A-B illustrate a sequence of steady-state modes where one mode is charging more than one channel according to an embodiment of the present invention.
Figure 11B:
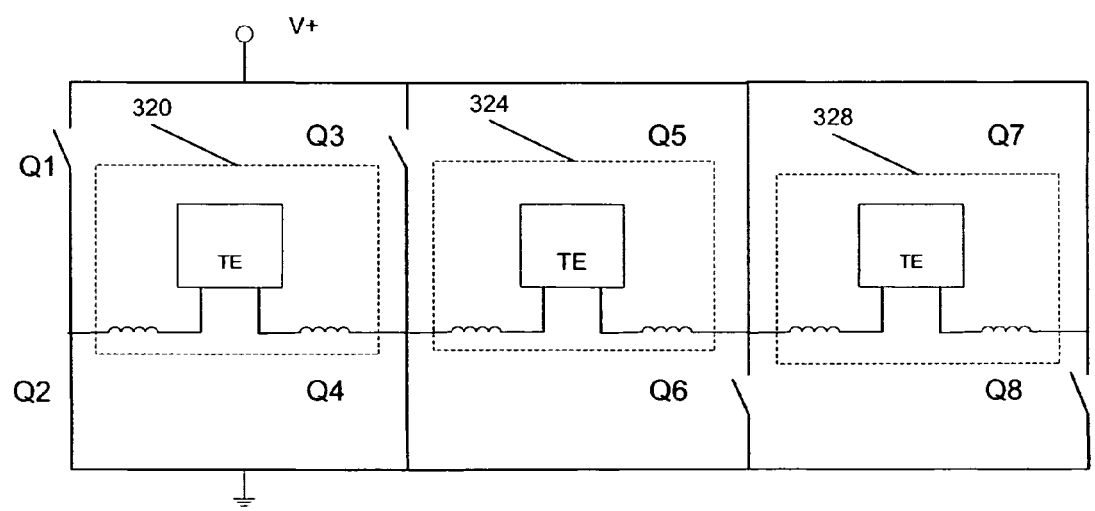

In another embodiment, more than one channel is charged at a time. For example, FIGS. 11A-B show a sequence of steady-state modes where a mode is charging more than one channel. FIG. 11A shows channel 320 being charged with positive polarity and channel 328 being charged with negative polarity. Channel 324 is freewheeling at ground. The switches Q1 and Q7 may be driven with PWM signals in this mode. FIG. 11B shows channel 324 being charged with negative polarity. Channel 320 is freewheeling at ground and channel 328 is freewheeling at V+. In this embodiment, only two modes during a duty cycle are used to charge the three channels, with the current through each channel still being controlled independently.

Note that the different modes may occur in any order. Additionally, more than three modes could occur during any duty cycle. There is no restriction on the number of modes in a duty cycle based on the number of channels. Also, any steady-state mode may occur more than once during the duty cycle. Thus, a channel may be charged multiple times in a duty cycle as part of different steady-state modes. Also, a channel may be charged in both polarities during a duty cycle. For example, a certain amount of time could be spent charging in an opposite polarity in order to achieve a certain voltage. Additionally, a device may be operated with no set duty cycle, but continuously changed based on feedback information.

In one embodiment, only one channel charges at a time, and all sections not charging are freewheeling. Each channel may do part of its freewheeling at +V and part at ground during a duty cycle. For example, the successive steady-state modes may occur in a certain order corresponding to a "double traverse" of the switches. A traverse of the high voltage gates and then a traverse of the low voltage gates may be made.

Figure 12:
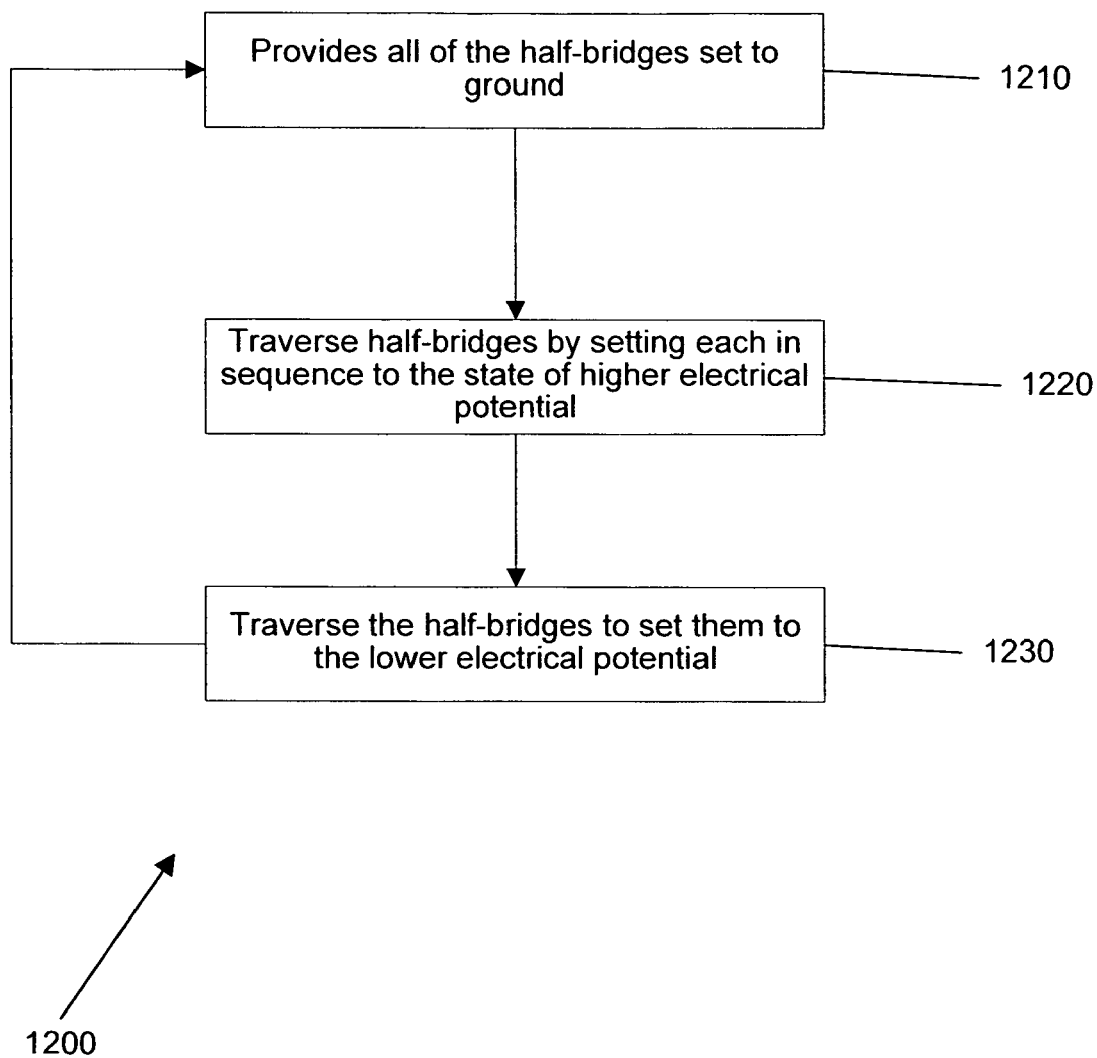
FIG. 12 illustrates a double traverse method for operating a multi-channel thermoelectric device according to an embodiment of the present invention.

FIG. 12 shows a "double traverse" method 1200 for operating a multi-channel device, such as device 300, according to an embodiment of the present invention. In step 1210, all of the half-bridges with the switches coupled with ground (all even numbered switches) are set in a closed state, and all of switches coupled with the higher potential are set to an open state. In, step 1220, the first half-bridge is set to the higher potential by opening the ground switch and closing the switch to higher potential. This mode and others modes may run for a finite period of time, or for approximately zero time. In step 1220, each remaining half-bridge is also set in sequence to the state of higher electrical potential after waiting for the run time of the previous mode to end.

When the last half-bridge has been set to the higher potential, in step 1230 the half-bridges are traversed and set to the lower electrical potential. This sequence may be repeated for as long as control of the loads is desired, where the wait times are chosen to obtain the desired currents in the loads. The wait times, conversely the running times of the modes, may be adjusted to keep the length of each double traverse equal to some constant in time. In one embodiment, each channel only charges in one polarity, except over a coarse timeframe as the application requires a change in load polarity.

Figure 13A:
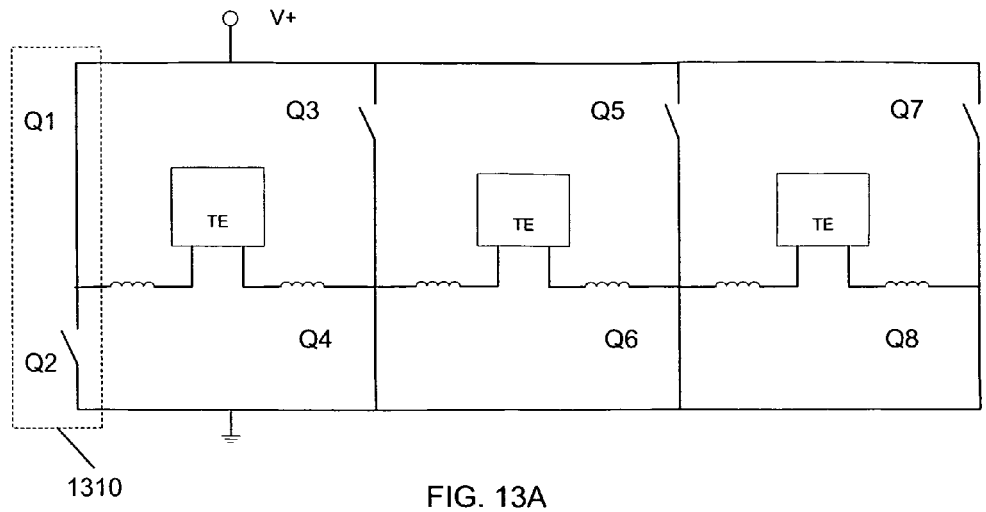
FIGS. 13A-13C illustrate different switch states that occur while operating a multi-channel thermoelectric device according to an embodiment of the present invention.
Figure 13B:
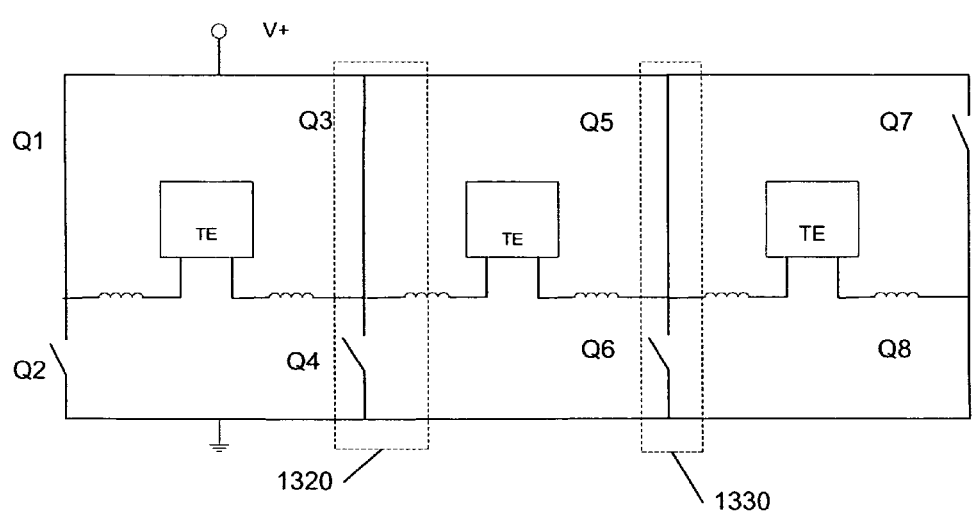
Figure 13C:
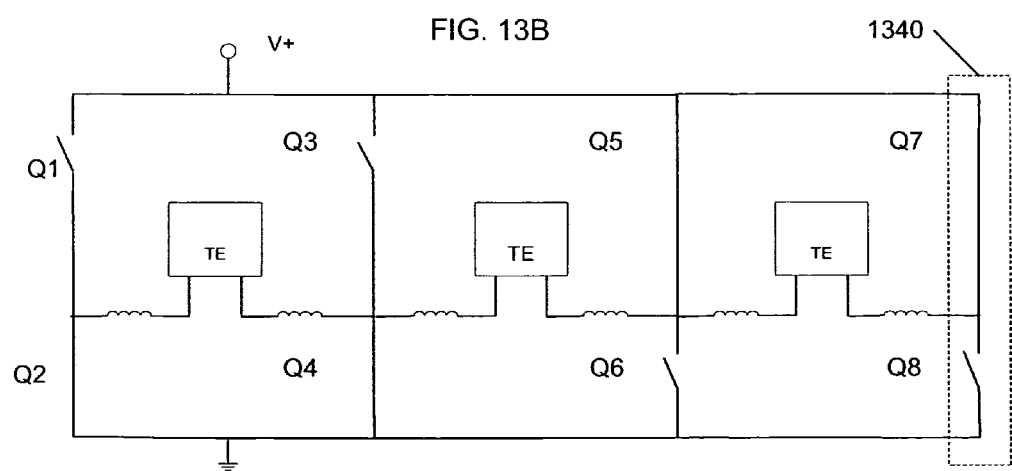

FIGS. 13A-13C shows device 300 at different stages of the double traverse method in order to heat the left and right channels, and cool the middle channel. FIG. 13A shows device 300 after the first half-bridge 1310 has been set to the higher electrical potential by closing Q1 and opening Q2. In one embodiment, the time spent in this mode is approximately 33% of the duty cycle. In this embodiment, if a device has four channels, then each channel would have about 25% of the duty cycle dedicated to charging each channel.

After the mode of FIG. 13A, the second half-bridge 1320 is set to the higher potential. The time spent in this mode is about zero. FIG. 13B shows the next switch mode where the third half-bridge 1330 is set to the higher potential. Appreciable time is spent in this mode to charge the right channel in the positive polarity. The other channels are freewheeling during the charging of the right channel.

After the mode of FIG. 13B, the last half-bridge 1340 is set to the higher potential. The time spent in this mode is about zero. The first half-bridge 1310 is also set to the lower potential, with no appreciable time spent in this mode. FIG. 13C shows the next mode where the second half-bridge is set to the lower potential. Appreciable time is spent in this mode to charge the middle channel in the negative polarity. After FIG. 13C, the third and fourth half-bridges are set to the lower potential, with no appreciable time spent in either mode. The sequence then may be repeated.

Figure 14:
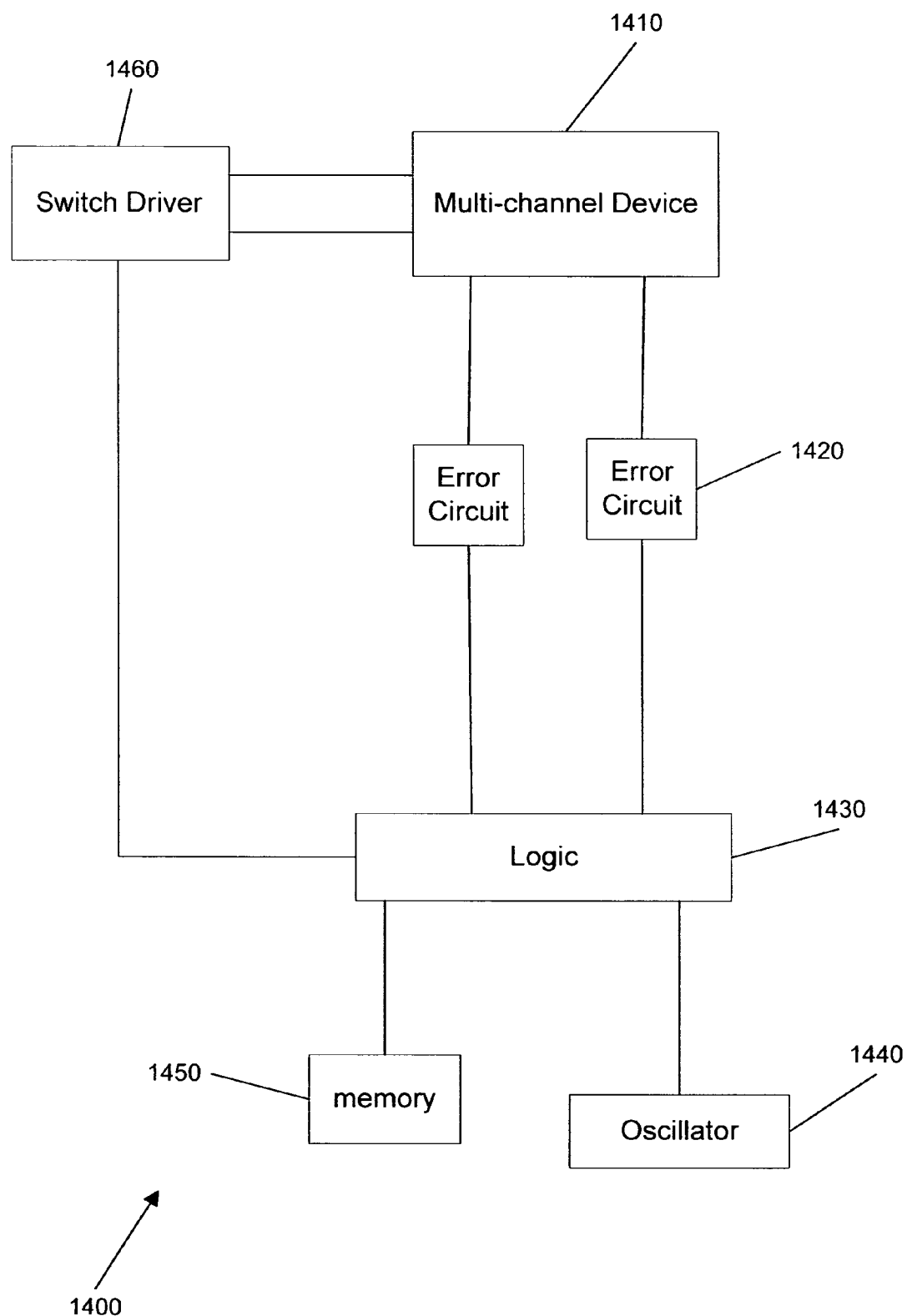
FIG. 14 illustrates a system according to an embodiment of the present invention.

FIG. 14 illustrates a system 1400 according to one embodiment of the present invention. The system as shown includes a multi-channel device 1410, such as device 300 of FIG. 3. As shown, device 1410 has two channels. Device 1410 may include or hold samples whose temperature is being controlled. Error circuits 1420 receive temperature signals from device 1410, or equivalently from samples thermally coupled with device 1410. In one embodiment, the error circuits 1420 compare the actual temperature of the samples with a desired temperature. This may be done by taking the difference in voltages that correspond to the temperatures.

Logic module 1430 receives the error signals. In one embodiment, an analog to digital converter converts an analog error signal to digital form. Logic module 1430 may be, or may include, a computer system, ASIC, microprocessor, etc. It may also include or be coupled with a display (e.g., monitor, LED display, etc.) and a user input device (e.g., mouse, keyboard, buttons, etc.). Logic module 1430 and the other components may be part of a stand alone or network connected computer system, or they may be directly attached to or incorporated in a thermal cycler system or device. Logic module 1430 may also include optimization software that executes in a microprocessor.

According to one embodiment, logic module 1430 includes instructions for optimizing and controlling the circuits and switches as described herein based in part on user input parameters. The instructions are preferably downloaded and stored in a memory module 1450 (e.g., hard drive or other memory such as a local or attached RAM or ROM), although the instructions can be provided on any software storage medium such as a floppy disk, CD, DVD, etc. It should be understood that computer code for implementing aspects of the present invention can be implemented in a variety of coding languages such as C, C++, Java, Visual Basic, and others, or any scripting language, such as VBScript, JavaScript, Perl or markup languages such as XML. In addition, a variety of languages and protocols can be used in the external and internal storage and transmission of data and commands according to aspects of the present invention.

Logic module 1430 may also be coupled with oscillator 1440 for producing a PWM signal. Logic module 1430 sends a signal to a switch driver 1460, which sends a control signal to the switches of device 1410. The control signals open and close the switches such that the device 1410 heats and cools as desired. The system 1400 may include analog and/or digital circuitry with A/D or D/A converters to interface between the circuitry as needed. A master digital binary time counter may be compared to the digital outputs of analog to digital converters through zero or more digital binary adders in order to identify the times for switching actions. The circuitry may use programmable or application specific logic.

Although embodiments have been directed to thermoelectric coolers/heat pumps, one skilled in the art will recognize the use in other applications requiring different polarities through different parts of a device. One example would be operating three brush-type or brushless-type direct current motors where torque is controlled by controlling current. A control loop might monitor either speed or position of the driven mechanism and provide the current-programming signal. Another example is an electrochemical process operating upon multiple batches in parallel according to the individual needs of each batch, which need to have both polarities possible.

While the invention has been described by way of example and in terms of the specific embodiments, it is to be understood that the invention is not limited to the disclosed embodiments. To the contrary, it is intended to cover various modifications and similar arrangements, in addition to those discussed above, as would be apparent to those skilled in the art. Therefore, the scope of the appended claims should be accorded the broadest interpretation so as to encompass all such modifications and similar arrangements.

What is claimed is:

1. A circuit comprising:
   N+1 half-bridges, each having a first and second switch and a center tap; and
   N channels, wherein the Kth channel includes:
      a load;
      a first terminal coupled with the center tap of the Kth half-bridge; and
      a second terminal coupled with the center tap of the (K+1)th half-bridge,
   wherein a state of the switches of the half-bridges determines if a current flows through each channel and a polarity of the current, wherein K and N are integers, wherein N is greater than one, and wherein K runs from one to N.

2. The circuit of claim 1, wherein the first switch of each half-bridge is coupled with a first potential, and wherein the second switch of each half-bridge is coupled with a second potential.

3. The circuit of claim 1, wherein each channel further includes a chargeable circuit.

4. The circuit of claim 3, wherein the chargeable circuit comprises an inductor.

5. The circuit of claim 1, wherein each switch of the half-bridges comprises a transistor.

6. The circuit of claim 5, wherein the transistor is protected in the reverse-current direction by a diode action.

7. The circuit of claim 5, wherein the transistor is a metal-oxide semiconductor field effect transistor.

8. The circuit of claim 1, further comprising a control circuit for controlling the switches of the half-bridges.

9. The circuit of claim 1, wherein the load of each channel comprises a thermoelectric element.

10. A method of using a circuit, comprising:
    providing a circuit including:
       N+1 half-bridges, each having a first and a second switch and a center tap; and
       N channels, wherein the Kth channel includes:
          a load;
          a first terminal coupled with the center tap of the Kth half-bridge; and
          a second terminal coupled with the center tap of the (K+1)th half-bridge,
       wherein K and N are integers, wherein N is greater than one, wherein K runs from one to N; and
    configuring the switches of the half-bridges to operate in a first mode during a first duty cycle, by:
       sending a first signal to the first switch of one of the half-bridges such that the first switch is in a closed state during a first part of the first mode; and
       sending a second signal to the second switch of a second one of the half-bridges such that the second switch is in a closed state during the first part, wherein the switch configuration determines if a current flows through each channel and determines a polarity of the current through an active channel.

11. The method of claim 10, wherein each channel of the provided circuit further includes a chargeable circuit, and wherein either the first or second signal is a pulse width modulated signal.

12. The method of claim 10, wherein each channel of the provided circuit further includes a chargeable circuit, further comprising:
charging the chargeable circuit of each active channel of the first mode;
subsequent to configuring the switches in a first mode, configuring the switches of the half-bridges to operate in one or more additional modes during the first duty cycle.

13. The method of claim 12, further comprising:
repeating configuring the switches of the half-bridges to operate in the first and subsequent modes during subsequent duty cycles.

14. The method of claim 12, wherein the first mode charges a first channel, and wherein the second mode charges a second channel while the first channel is in a freewheel state.

15. The method of claim 14, wherein the freewheel state is at ground.

16. The method of claim 14, wherein the same polarity of current in the first channel during the first mode continues during the second mode.

17. The method of claim 12, wherein the first mode charges a first channel in one polarity and the second mode charges the first channel in an opposite polarity.

18. The method of claim 12, wherein the first mode charges a first channel and charges a second channel.

19. The method of claim 12, wherein only one channel is charged during a mode, wherein the steps of configuring the switches of the half-bridges to operate in the first and additional modes during the first duty cycle comprise:
setting all of the second switches of the half-bridges in a closed state;
opening the second switch and closing the first switch of the first half-bridge to operate in the first mode;
opening the second switch and closing the first switch of the Kth half-bridge to operate in a Kth mode, wherein each mode may have a zero or finite duration; and
closing each second switch and opening each first switch of the Kth half-bridge to operate in a (N+K)th mode.

20. The method of claim 12, wherein each duty cycle is of a fixed duration.

21. A system comprising:
a circuit including:
N+1 half-bridges, each having a first and a second switch and a center tap; and
N channels, wherein the Kth channel includes:
a load;
a first terminal coupled with the center tap of the Kth half-bridge; and
a second terminal coupled with the center tap of the (K+1)th half-bridge,
wherein K and N are integers, wherein N is greater than one, wherein K runs from one to N; and
logic to configure the switches of the half-bridges to operate in a first mode during a first duty cycle, by:
sending a closed signal to the first switch of a first of the half-bridges; and
sending a closed signal to the second switch of a second one of the half-bridges, wherein the switch configuration determines if a current flows through each channel and a polarity of the current through an active channel.

22. The system of claim 21, further comprising a feedback loop from the circuit to the logic.

23. The system of claim 21, wherein the logic comprises programmable logic.

24. A circuit comprising:
a first half-bridge switching arrangement having a first center tap;
a first electrical load having a first terminal coupled with the first center tap;
a second half-bridge switching arrangement having a second center tap, wherein a second terminal of the first load is coupled with the second center tap;
a second electrical load having a first terminal coupled with the second center tap; and
a third half-bridge switching arrangement having a third center tap, wherein a second terminal of the second electrical load is coupled with the third center tap,
wherein a switch state of the half-bridges determines if a current is applied to each load and a polarity of the current, if applied.

25. The circuit of claim 24, wherein the first and second electrical loads each include a thermoelectric element.

26. The circuit of claim 25, wherein the thermoelectric elements are Peltier elements.

27. The circuit of claim 24, wherein a first switch of each half-bridge switching arrangement is coupled with a first potential, and wherein a second switch of each half-bridge switching arrangement is coupled with a second potential.

28. The circuit of claim 24, further comprising a control circuit for controlling the half-bridge switching arrangements.

29. The circuit of claim 1, wherein the first and second electrical loads each include a chargeable circuit.

30. A thermal cycler, comprising:
at least two thermal elements, each for controlling a temperature of a sample holding region;
a circuit arrangement including:
a) a first half-bridge switching arrangement having a first center tap coupled with a first terminal of a first thermal element;
b) a second half-bridge switching arrangement having a second center tap coupled with a second terminal of the first thermal element and a first terminal of a second thermal element; and
c) a third half-bridge switching arrangement having a third center tap coupled with a second terminal of the second thermal element;
a control circuit for controlling the switch states of the half-bridges, wherein a switch state of the half-bridges determines if a current is applied to each of the thermal elements and a polarity of the current, if applied.

31. The thermal cycler of claim 30, wherein each half-bridge switching arrangement includes a first and a second switch, and wherein the first switch of each half-bridge switching arrangement is coupled with a first potential, and wherein the second switch of each half-bridge switching arrangement is coupled with a second potential.

32. The thermal cycler of claim 31, wherein one of the first or the second potential is ground.

33. The thermal cycler of claim 30, wherein when a current of a first polarity is applied to a thermal element, the thermal element transfers heat to the sample holding region, and when a current of an opposite polarity is applied to the thermal element, the thermal element transfers heat away from the sample holding region.

34. The thermal cycler of claim 30, wherein each thermal element comprises a Peltier element configured to transfer heat to and from the sample holding region in response to the polarity of current applied.

35. The thermal cycler of claim 30, wherein a sample holding region comprises a well for holding a sample.

* * * * *